United States Patent [19]

Fitzjarrell

[11] 4,318,566
[45] Mar. 9, 1982

[54] WIND FAIRING DEVICE

[75] Inventor: Gerald M. Fitzjarrell, Brownsville, Oreg.

[73] Assignee: Takena Industries, Inc., Albany, Oreg.

[21] Appl. No.: 137,135

[22] Filed: Apr. 4, 1980

[51] Int. Cl.³ .............................................. B62D 35/00
[52] U.S. Cl. .................................................... 296/1 S
[58] Field of Search .................................... 296/1 S, 91

[56] References Cited

U.S. PATENT DOCUMENTS

| | | | |
|---|---|---|---|
| 2,514,695 | 7/1950 | Dempsey | 296/1 S |
| 4,098,534 | 7/1978 | Wood | 296/1 S |
| 4,135,754 | 1/1979 | Fitzgerald et al. | 296/1 S |

FOREIGN PATENT DOCUMENTS 1560381  2/1980  United Kingdom .............. 296/1 S

OTHER PUBLICATIONS

"Nose Job Improves Trailers Ability to Get Along", article by Rob Treiewer.
"The Cover of Economy", Mechanic Illustrated, Sep. 1976, p. 104.

Primary Examiner—Richard A. Bertsch
Assistant Examiner—Ross Weaver
Attorney, Agent, or Firm—Kolisch, Hartwell & Dickinson

[57] ABSTRACT

A fairing device for mounting on the upright forward face of a vehicle for reducing aerodynamic drag. Wall expanses in the device project forwardly of the forward face of the vehicle and provide surfaces acting to deflect moving air around the sides and top of the vehicle.

6 Claims, 3 Drawing Figures

U.S. Patent   Mar. 9, 1982   4,318,566
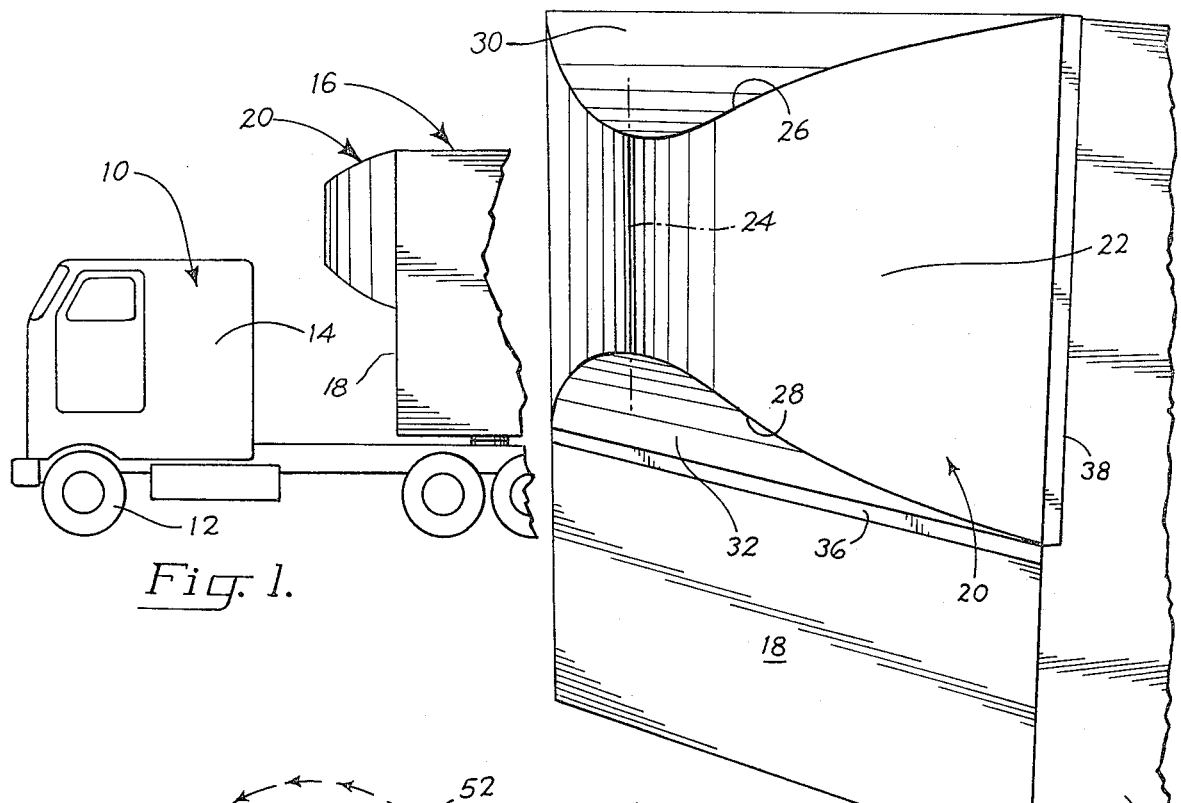
*Fig. 1.*
*Fig. 2.*
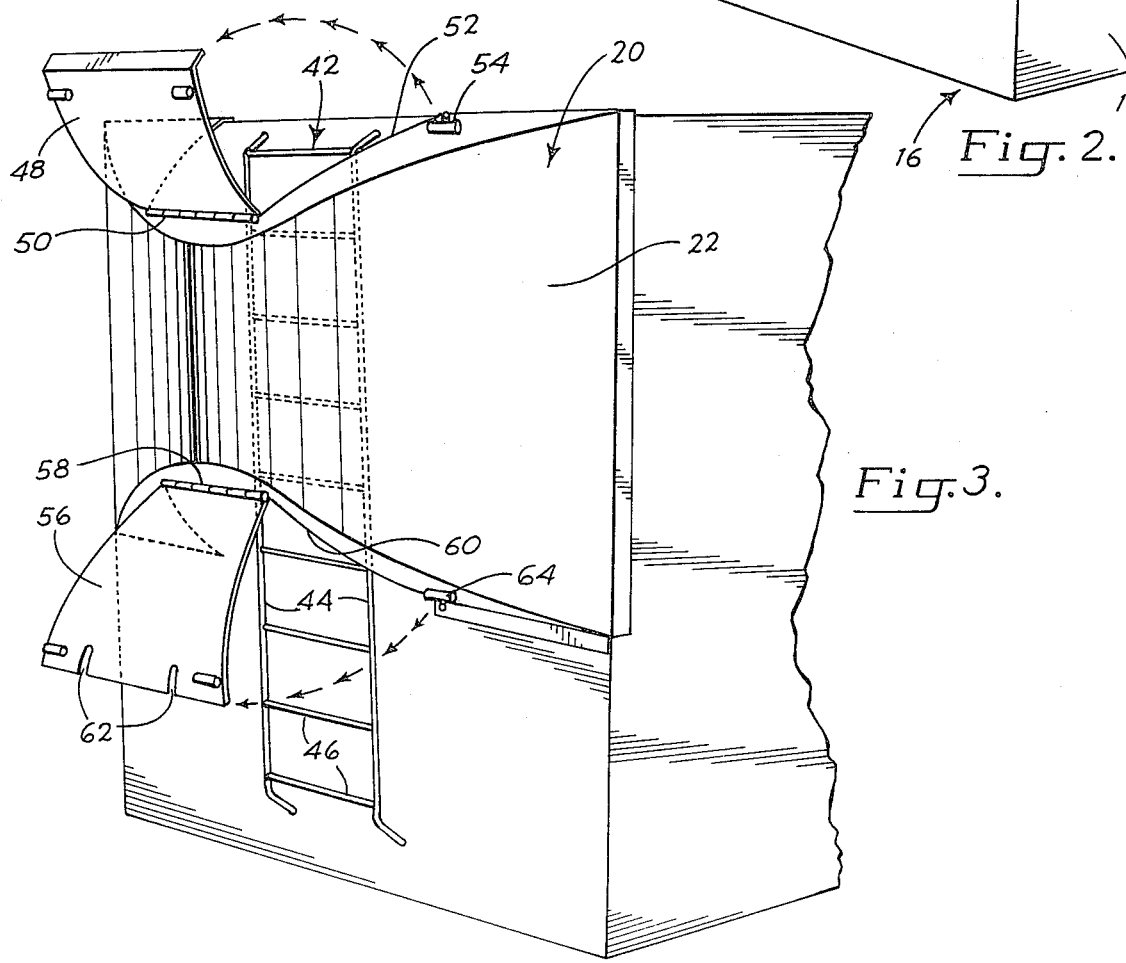
*Fig. 3.*

WIND FAIRING DEVICE

BACKGROUND AND SUMMARY OF THE INVENTION

This invention relates to a fairing device adapted to be mounted on the upright forward face of a vehicle for reducing aerodynamic drag.

The usual truck which is used in hauling materials on the highway, includes a cab which houses the vehicle operator and a box-like body to the rear of the cab in which the cargo to be transported is loaded. In a truck of the type which is commonly referred to as a "semi," the body is part of a trailer which is connected through a fifth wheel connection with a tractor which carries the cab. In other trucks, the cargo carrying body and cab may be supported on the same frame. In either type of arrangement however, the body of the truck usually presents an upright forward face which extends upwardly above the cab and which offers considerable wind resistance or aerodynamic drag when the vehicle is moving over the highway at usual highway speeds. With the price of motor fuel having escalated considerably over the past few years, this wind resistance or drag becomes a significant figure in vehicle operating costs.

Various types of deflectors or drag reducing devices have been proposed. Some have the disadvantage of requiring considerable modification of the vehicle to which they are attached. Others have marginal efficiency in certain type of wind situations. Other types of deflectors are characterized by a compound curvature which makes them difficult to manufacture, and also limits adaptability to various sizes of truck bodies.

A further factor to be considered in the construction of a fairing device in that some truck bodies have open tops, as exemplified by the truck bodies used in hauling wood chips, etc. To prepare this type of truck body for transport, it is common to lash a cover or tarpaulin over the top of the body using hooks or fittings provided adjacent the tops of the various side walls in the truck body. To facilitate the securing of such a cover in place, ladder structure should be provided extending upwardly along an end wall whereby an operator may climb the ladder and make suitable lashing of the cover. Fairing devices of which I am aware make no provision for the installation of such a ladder structure on a truck body, nor are the devices of such a type that would readily accommodate the inclusion of a ladder.

Generally, therefore, an object of this invention is to provide a fairing device which is relatively simply constructed and which will reduce wind drag or resistance under varying wind conditions.

Another object of the invention is to provide such a device which is readily installable on the upright front face of a vehicle body.

Yet another object of the invention is to provide such a device which is readily prepared in different sizes to accommodate different sizes of truck bodies.

Yet a further object of the invention is to provide such a device which includes access doors or door panels which may be opened to provide a passageway through the device and usable in conjunction with a ladder extending in such passageway.

These and other objects and advantages are attained by the invention which will become more fully apparent from the following descriptions, to be taken in conjunction with the accompanying drawings, wherein:

BRIEF DESCRIPTION OF THE DRAWINGS

FIG. 1 is a simplified sketch illustrating portions of a truck vehicle and showing such with a truck body in the vehicle equipped with a fairing device as contemplated;

FIG. 2 is an enlarged perspective view illustrating the fairing device; and

FIG. 3 is a view, similar to FIG. 2, but illustrating a modification of the invention.

DETAILED DESCRIPTION OF THE DRAWINGS

Referring now to the drawings, in FIG. 1 there is illustrated portions of a truck vehicle with which the fairing device of the invention may advantageously be used. The truck includes a tractor 10. Supported over the front wheels 12 of the tractor is a cab 14 which houses the driver of the truck. Secured to the frame of the tractor and trailing the tractor is a trailer 16. The trailer has a body bounded by an upright forward face 18. Fastened to the trailer body and forming a deflector operable to reduce aerodynamic drag is a fairing device 20.

Referring now also to FIG. 2, the fairing device illustrated covers the upper portion of the front or forward face of the trailer body. The device includes a front wall expanse 22 which extends between opposite sides of the vehicle body. The front expanse is convexly curved with curvature limited essentially to curvature about a vertical axis. The curvature may be generated over a uniform radius, although it need not be, as in a device where it is desired to have side portions of the front expanse curving over a sharper radius than central portions of the expanse. The front wall expanse has a forward most extremity indicated generally at the region shown at 24 which is located substantially midway between the sides of the vehicle. Portions of the expanse on either side of this extremity curve symmetrically rearwardly to meet the sides of the vehicle.

In the device shown in FIG. 2, the front wall expanse has an upper margin 26 which, progressing between opposite sides of the vehicle body, moves downwardly from the upper left hand corner of the device as shown in FIG. 2 until mid region 24 is reached, and then reversely curves to move upwardly to the opposite corner. In a similar type of curvature, lower margin 28 moves inwardly and upwardly extending toward the mid region, and thence inclines downwardly and outwardly to the opposite corner. This imparts to the front expanse, when such is viewed from the front and in a horizontal direction, a generally hour-glass profile.

The device further includes top and bottom wall expanses shown at 30 and 32, each with curvature limited essentially to curvature about a horizontal axis, which join with the front expanse at the upper and lower margins earlier described. The top expanse 30 is convexly curved as it extends forwardly and downwardly to meet the upper margin of the front expanse. The bottom expanse is convexly curved as such extends upwardly and forwardly to meet the lower margin of the front wall expanse.

Each of the opposite sides of device 20 is provided with a flange such as flange 38 which overlies a side of the trailer body. A flange 36 extends along the base of the device which lies against the front face of the trailer body. A flange (not illustrated) overlies the top of the trailer body. These flanges are used in securing the device to the body using suitable fasteners.

By reason of the construction described, it will be noted that aerodynamic drag is reduced. Air moving over the top of the cab of the vehicle does not impinge directly on a flat face but against the convexly curved front wall expanse which functions to divert such air in streamline now to the sides of the vehicle. Adjacent the top of the device, air is similarly deflected upwardly over the top of the trailer body with minimal turbulence produced as the air stream moves rearwardly of the fairing device. As seen in FIG. 1, preferably the lower margin of the front wall expanse at the midpoint of the device, is approximately at the level of the vehicle cab, so that air on moving over the cab is, for the most part, directed laterally of the truck body sides and over the top of the body. An air stream moving against bottom expanse 32 is directed around the base of the fairing device.

Referring now to FIG. 3, as earlier discussed, with truck bodies which are open at the top it is advantageous to provide a ladder extending vertically along the front face of the body to permit the driver to climb up to the top of the body when securing a tarp or cover over the top of the load. In FIG. 3 such a ladder is shown at 42 which is secured to the front wall of the truck body. The ladder includes side rails 44 and ladder rungs 46.

In the device of FIG. 3, top expanse 30 is provided with a hinged door panel 48 hinged at 50 to the wall expanse and operable to close opening 52 with the door panel swung to a lowered position. Locking devices such as latch bolt 54 may be provided for locking the door panel in place with the door panel occupying its lowered position.

Bottom expanse 32 is also provided with a door panel, indicated in this instance at 56, hinged at 58 and closing off opening 60. Door panel 56 includes notches 62 which accommodate the side rails of the ladder with the door panel closing off opening 60. Again, locking devices such as a latch bolt 64 may be included to lock the lower door panel in a closed position.

Openings 52, 60 are one above the other and provide a passageway through the fairing device, this passageway including the ladder. With the front wall expanse positioned, at region 24, some two feet in front of forward face 18 of the trailer body, with the door panels swung to their open positions, sufficient room is provided for a person to climb the ladder while passing through the device.

While two modifications of the invention have been described, it should be obvious that variations and modifications are possible to one skilled in the art.

It is claimed and desired to secure by Letters Patent:

1. A fairing device for mounting on the upright forward face of a vehicle for reducing aerodynamic drag comprising:
    a front wall expanse extending between opposite sides of the vehicle which is convexly curved with curvature limited essentially to curvature about a vertical axis, said wall expanse having a forward most extremity located substantially midway between the sides of the vehicle and portions of the expanse on either side of this extremity curving symmetrically rearwardly to meet the sides of the vehicle,
    said front wall expanse having an upper margin that, progressing between opposite sides of the vehicle, curves downwardly and upwardly and further having a lower margin that, progressing between opposite sides of the vehicle, curves upwardly and downwardly thereby to impart an hourglass profile to the expanse when viewed from the front and in an horizontal direction, and
    top and bottom wall expanses with curvature limited essentially about horizontal axes extending from the face of the vehicle at the top and at the bottom of the device and joining with said upper and lower margins,
    each of said top and bottom wall expanses including an opening and a hinged door panel for the opening closing it off and which can be swung to one side to open up the opening of the wall expanse,
    said openings being disposed one above the other and in substantial vertical alignment to produce a passageway through the device.

2. The fairing device of claim 1, in combination with the upright forward face of a trailer vehicle having a vertically extending ladder secured to the vehicle intermediate the sides of the forward face, said passageway through the device produced by said openings having said ladder positioned therein.

3. The fairing device of claim 1, wherein said hinged door panels are hinged for swinging movement about horizontal axes.

4. A fairing device for mounting on the upright forward face of a vehicle for reducing aerodynamic drag comprising:
    wall structure extending from the opposite sides of the vehicle sloping forwardly and inwardly of said forward face and wall structure extending from the top of the vehicle and from a region spaced downwardly from the top of the forward face sloping forwardly and downwardly and forwardly and upwardly, respectively, said wall structures collectively forming a forward extension disposed in front of the forward face,
    said wall structures which slope forwardly and downwardly and forwardly and upwardly from the forward face each having an opening and a hinged door panel for the opening closing it off which may be swung to one side to open up the opening in the wall structure, said openings being disposed one above the other and in substantial vertical alignment to provide a passageway through the device.

5. The fairing device of claim 4, wherein said hinged door panels are hingedly mounted for swinging movement about horizontal axes.

6. The fairing device of claim 4, in combination with a vehicle having an upright forward face which includes extending vertically therealong a ladder, and wherein said ladder extends through said passageway.

* * * * *